Feb. 27, 1940. R. R. CHAPPELL ET AL 2,191,955
WIND INTENSITY AND DIRECTION TRANSMITTER AND INDICATOR
Filed June 1, 1936 4 Sheets-Sheet 1

Inventors.
Ralph R. Chappell
Rutger B. Colt
Stephen Cerstvik
Attorney.

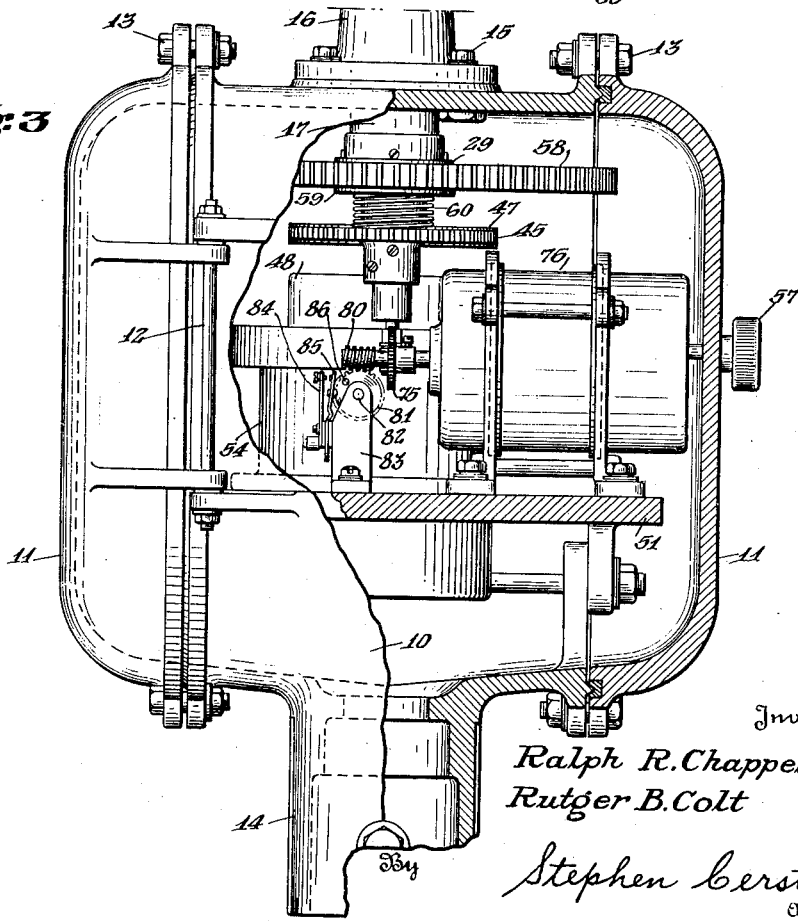

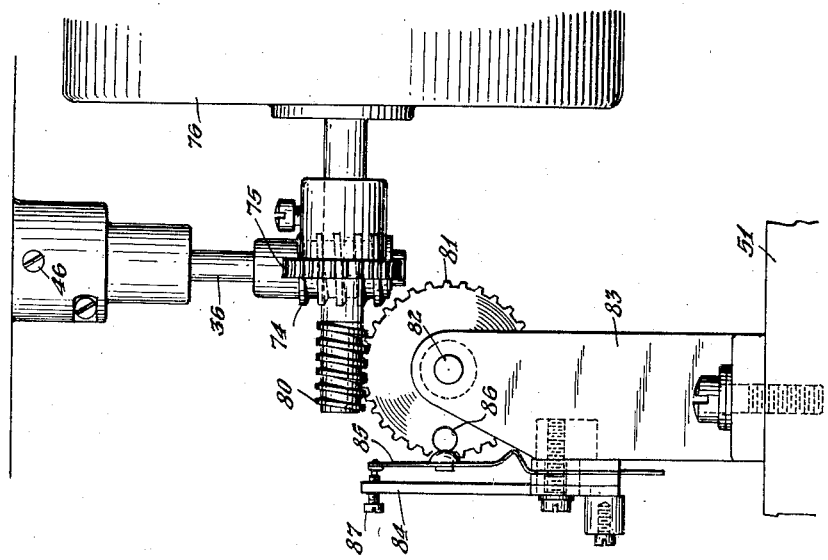
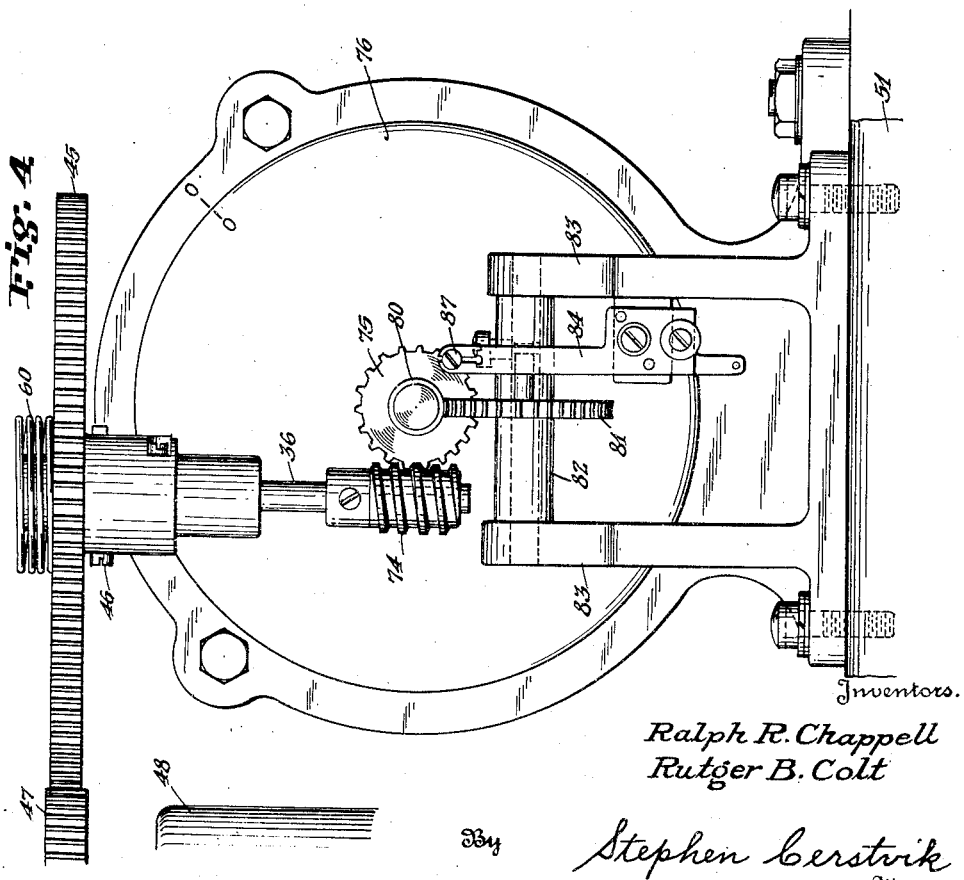

Feb. 27, 1940.  R. R. CHAPPELL ET AL  2,191,955
WIND INTENSITY AND DIRECTION TRANSMITTER AND INDICATOR
Filed June 1, 1936  4 Sheets-Sheet 4

Ralph R. Chappell
Rutger B. Colt
INVENTORS.

BY Stephen Cerstvik
ATTORNEY.

Patented Feb. 27, 1940

2,191,955

UNITED STATES PATENT OFFICE 2,191,955

WIND INTENSITY AND DIRECTION TRANSMITTER AND INDICATOR

Ralph R. Chappell, Richmond, Va., and Rutger B. Colt, Baltimore, Md., assignors to Bendix Aviation Corporation, South Bend, Ind., a corporation of Delaware Application June 1, 1936, Serial No. 82,988

2 Claims. (Cl. 177—351)

This invention relates to precision instruments, and more particularly to mechanism for measuring and transmitting wind intensity and wind direction.

One of the objects of the present invention is to provide novel apparatus wherein means for determining and transmitting wind speed and direction are combined into a single compact unit for mounting on the mast of a ship or similar support.

Another object is to provide novel apparatus wherein a rotating cup anemometer and a wind direction indicator vane are concentrically mounted in proximity to one another whereby both instruments will be actuated by the same wind currents at the same location and time.

A further object is to provide a wind direction indicator embodying novel means for damping the movements of the wind direction indicating means whereby more steady and more accurate indications may be obtained.

A still further object is to provide novel wind direction transmitting means which are so constructed that resettings or corrections may be readily made while the transmitting system is fully energized, thereby facilitating the making of such changes and increasing the accuracy with which the same may be made.

Another object is to provide novel wind intensity measuring and transmitting means whereby a continuous indication of the instantaneous wind velocity as well as an indication of the total of every mile of air passing an anemometer during any given period of time is obtained.

The above and further objects and novel features of the invention will more fully appear from the following detail description when taken in connection with the accompanying drawings. It is to be expressly understood, however, that the drawings are for the purpose of illustration only and are not designed as a definition of the limits of the invention, reference for this latter purpose being had primarily to the appended claims.

In the drawings, wherein like reference characters refer to like parts throughout the several views, Fig. 1 is a side elevation, partly in section and with parts broken away, of one form of measuring and transmitting unit comprehended by the present invention;

Fig. 2 is a diagrammatic illustration of a system in which the unit of Fig. 1 may be employed;

Fig. 3 is a side elevation, partly in section and with parts broken away, the section being taken at right angles to the section of Fig. 1;

Figs. 4 and 5 are detail views on an enlarged scale showing the gearing employed in the wind velocity transmitter, the views being taken at right angles to one another; and, Fig. 6 is a diagrammatic view showing a modification of the damping means which may be employed in the system of Fig. 2.

Figure 1:
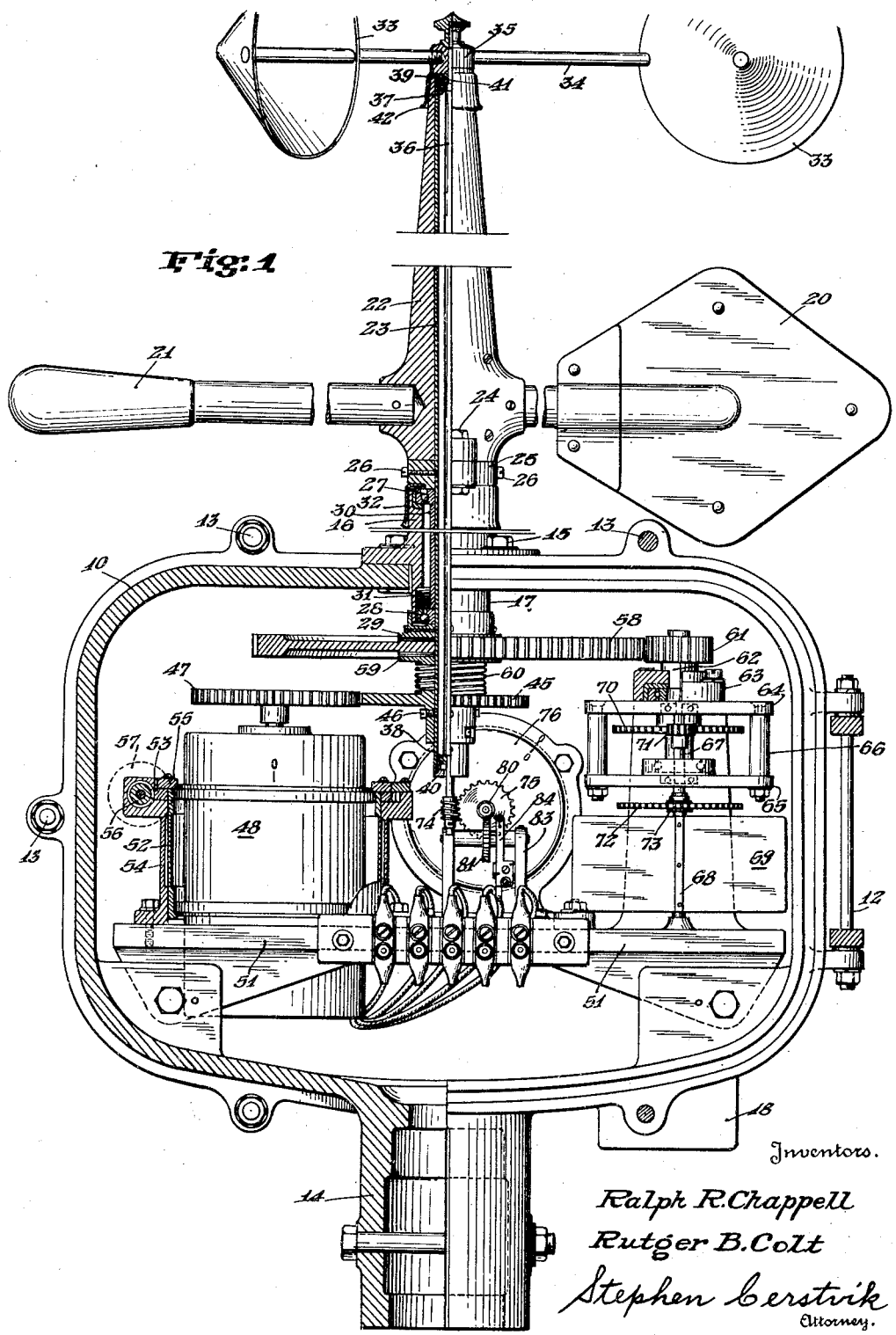

The invention, as illustrated in the accompanying drawings, by way of example, comprehends the provision of a novel wind speed and direction determining and transmitting unit which is small and compact, and wherein the various parts are readily accessible for the purpose of making adjustments, repairs or replacements of parts. The entire unit is mounted in a single housing or casing comprising a central portion 10 and a pair of covers 11, 11 on opposed sides thereof, either or both of which may be pivotally supported on portion 10 by a hinge 12 and held in closed position by bolts 13. A depending socket 14 is provided on the casing whereby the same may be secured to a stud 14' (see Fig. 2) on the mast or yard-arm of a ship or on any other suitable support. Secured on the top of casing 10 by bolts 15 is a flanged spindle housing having an upwardly extending hollow portion 16 and a depending portion 17 which extends through a central opening in the casing. A flanged opening 18 is provided in the base of casing 10 through which electric conductors may be led.

A vane for determining wind direction and an anemometer for measuring wind velocity are concentrically mounted in a novel manner so that the spindles thereof extend through housing 16, 17 into casing 10, 11 whereby the different characteristics of the wind may be determined at substantially the same location, and the necessity for providing separate units for measuring each characteristic with said units placed at different points and accordingly subjected to wind currents which may differ in character or to the same currents at different instants of time, is obviated. In the form shown, a wind direction indicator or vane 20 and a diametrically disposed counterweight arm 21 are secured to a sleeve 22 which surrounds a hollow spindle 23 and is secured thereto by means of bolts 24 which engage a clamp or collar 25 that is fixedly mounted on the spindle by means of set screws 26. Spindle 23 extends through housing 16, 17 into casing 10, and the entire vane assembly is rotatably supported by said housing on a pair of thrust ball bearings 27 and 28. The inner races of said bearings are held in position against collar 25 and a disc 29 secured on spindle 23 adjacent the lower end of housing 16, 17 by a spacer sleeve 30, and the outer race of the lowermost of said bearings is yieldingly held against upward movement by a retaining spring 31 interposed between said outer race and an internal shoulder in housing 17. An annular skirt 32 is preferably secured to the lower surface of collar 25 and surrounds the upper end of housing 16 to act as a shield for preventing the entrance of dirt and moisture through bearing 27.

The anemometer for measuring wind velocity is preferably of the plural cup, rotating type and is concentric with and supported by the vane assembly above described. As shown, said anemometer is constituted by a plurality of cups 33 mounted on arms 34 extending radially from a hub 35 which is secured to a shaft or spindle 36, said cups being designed to rotate said spindle at a speed bearing a known proportion to the velocity of the wind impinging thereon. Spindle 36 is concentric with spindle 23 and is rotatably supported thereby on a pair of thrust ball bearings 37 and 38 which are positioned in the hollow shaft or spindle 23 at the opposite ends thereof by retaining nuts 39 and 40, respectively. A spacer sleeve 41 is interposed between hub 35 and the inner race of bearing 37 and a skirt or shield 42 is secured to said hub to prevent entrance of dirt and moisture through said bearing.

Although suitable indicating means may be operated directly by spindles 23 and 36, inasmuch as the anemometer and direction indicating vane are always located in an exposed place which is often comparatively inaccessible, means are preferably provided for electrically transmitting the movements thereof to one or more remote stations. Said transmitting means, in the illustrated embodiment, are housed in the single casing 10, 11 together with novel damping means for vane 20, 21.

In the form shown, the means for transmitting movements of vane 20, 21 and hence of spindle 23 to a pointer 43 of a wind direction indicating instrument 44 (Fig. 2) comprise a gear 45 secured by means of screw pins 46 to spindle 23 adjacent the lower end thereof. Said gear is in constant mesh with a gear 47 mounted for rotation with the armature of a self-synchronous motor 48 which is electrically connected in the usual or any suitable manner to a similar motor housed in instrument 44 and having pointer 43 secured to the armature thereof.

Any suitable type of self-synchronous motor may be employed, those shown being of the type having three-phase windings on the armatures thereof connected by leads *a*, *b* and *c* and having stators supplied with excitation current from alternating current leads 49 and 50. Since the armatures of self-synchronous motors at the indicating instruments 44 move in synchronism with the armature of transmitting motor 48 and the latter is driven in synchronism with spindle 23, it will be apparent that pointer 43, in combination with a properly marked dial, will indicate the position of vane 20 and hence the direction in which the prevailing wind currents are blowing. The construction of instruments 44 may be of the usual or any suitable or desirable construction and does not per se constitute any part of the present invention. It is accordingly believed to be unnecessary to illustrate and describe said instruments in more detail.

In order that the position of pointer 43 may be adjusted with respect to its zero or reference position to make any necessary adjustments or corrections, or the direction transmitter set to its zero position while the whole system is energized, transmitting selsyn motor 48 is mounted on a support plate 51 in casing 10, 11 in a novel manner to permit the outer casing and stator of the motor to be rotated independently of the armature thereof. In the embodiment illustrated, motor 48 is mounted in a basket 52 which is in turn supported by a flange 53 thereon that slidably engages the upper surface of a bracket or nest 54 secured to plate 51. A ring 55 is provided for retaining basket 52 in nest 54 and a worm gear is cut in flange 53 which engages a worm 56 that may be rotated by means of a knob 57. The stator of motor 48 may thus be readily rotated for any desired purpose when the wind direction indicating and transmitting system is fully energized.

For the purpose of obtaining a more steady and accurate indication of wind direction at all times, novel means are provided in casing 10, 11 whereby disturbances of the indicator pointers effected by temporary eddy currents and by the components of gusts not acting in the true direction of the prevailing wind are substantially eliminated. In the embodiment of Fig. 1 said means are shown as being constituted by damping mechanism adapted to be driven by a gear 58 which is preferably loosely mounted on spindle 23 but drivably associated therewith through a yielding driving connection comprising a pair of friction plates 29 and 59 that engage opposite sides of the web portion of gear 58. Plate 29 is secured to spindle 23 for rotation therewith while plate 59 is loosely mounted on said spindle. The friction surfaces of said plates and gear are normally held in driving engagement by a coil spring 60 interposed between gear 45 and plate 59.

Gear 58 is constantly in mesh with a smaller gear 61 secured to a vertical shaft 62 which is rotatably supported by an inverted yoke or bridge 63 mounted on support plate 51 at the opposite side of casing 10 from motor 48. A damper frame comprising a pair of plates 64 and 65 held in spaced relation by sleeves 66 is secured to bridge 63 and serves as means for journalling and supporting a plurality of vertically extending shafts 62, 67 and 68, the lower end of the latter shaft being journalled on support plate 51 and having a fan 69 mounted thereon. Said fan is adapted to be driven from gear 61 through a step-up gear train which comprises a gear 70 on shaft 62 that meshes with a pinion 71 on shaft 67 and a gear 72 on the latter shaft which meshes with a pinion 73 on fan shaft 68. Sudden movements of spindle 23 and hence of pointer 43 by temporary or momentary forces acting on and tending to oscillate vane 20 are thus prevented without hampering the movement of said vane in response to the application of a constant force. Vane 20 accordingly assumes a comparatively steady position with the surfaces thereon parallel to the prevailing wind currents. The relatively light weight gears of the damper gear train are protected against excessive strains resulting from gusts or other causes by the yielding driving connection between gear 58 and spindle 23. It will be apparent, however, that gear 58 may be rigidly secured to spindle 23, if desired.

Means are also provided in casing 10, 11 for transmitting the movements of anemometer spindle 36 to one or more remote stations for producing indications of the total wind passing cups 33 and of the speed of the wind at any instant. As shown, said means comprise a worm 74 secured to the lower end of the spindle 36 and meshing with a worm gear 75 on the horizontal armature shaft of a self-synchronous motor 76 which is mounted in a suitable cradle secured to support plate 51. The rotational movement of the armature of motor 76 is preferably repeated by the armature of a similar motor in a distributing unit 77 (Fig. 2) and converted at said unit into angular movement proportional to the angular velocity thereof by any suitable means known to the art, such, for example, as the distributor mechanism shown and fully described in Chappell et al. application Serial No. 78,928 filed May 9, 1936. The angular movement thus produced at the distributing unit may be relayed by means of a self-synchronous motor to one or more instruments 78 provided with a pointer 79 for indicating instantaneous wind speed. The armature windings of motor 76 are connected to those of the receiving motor at distributing unit 77 by leads $l$, $m$ and $n$, and a second motor at said unit for transmitting the angular movement above referred to is connected by leads $x$, $y$ and $z$ to a selsyn motor associated with instrument 78. The stators of all of said motors may be energized by alternating current source 49, 50. Since the details of construction of the converting and distributing unit 77 and indicators 78 do not per se constitute any part of the present invention, it is not believed to be necessary to illustrate and herein describe said details. Said unit and indicator have accordingly been shown diagrammatically and for a complete description thereof reference is had to the above mentioned copending application.

Means are also provided for determining and recording the total amount of wind passing cups 33 in any given period of time, and in the illustrated embodiment such means include a worm 80 which is mounted on an extended portion of the armature shaft of motor 76 and adapted to mesh with a worm gear 81. The latter is rotatably supported by a shaft 82 (see Fig. 3) journalled in brackets 83, 83 which are secured to and project upwardly from plate 51. A pair of normally disengaged contacts 84 and 85, the latter of which is resiliently mounted, are likewise mounted on one of the brackets 83 and are caused to momentarily contact one another at least once during each revolution of worm gear 81 by a pin 86 projecting from the latter gear and adapted to engage and actuate resilient contact arm 85. The gap between contacts 84 and 85 when the same are in disengaged position may be adjusted by a screw 87 (see Fig. 5) or any other suitable means.

Contacts 84 and 85 are connected to source 49, 50 in series with a solenoid 88 (see Fig. 2) so that said solenoid is energized whenever said contacts are moved into engagement with one another. Solenoid 88 when energized is effective to actuate the shaft 89 of a counter 90 through the medium of a pawl and ratchet mechanism 91, 92. Since contacts 84, 85 are closed once for each revolution of worm gear 81, ratchet 92 will also be moved one step for each revolution of said gear. The counter or recorder operated by shaft 89 may be constructed to totalize the number of miles of wind passing cups 33, the calibration being accomplished by taking into consideration the number of revolutions per unit of time which will be imparted to spindle 36 by a wind of a given force and the reduction ratio of worm gear train 74, 75 and 80, 81.

Figure 6:
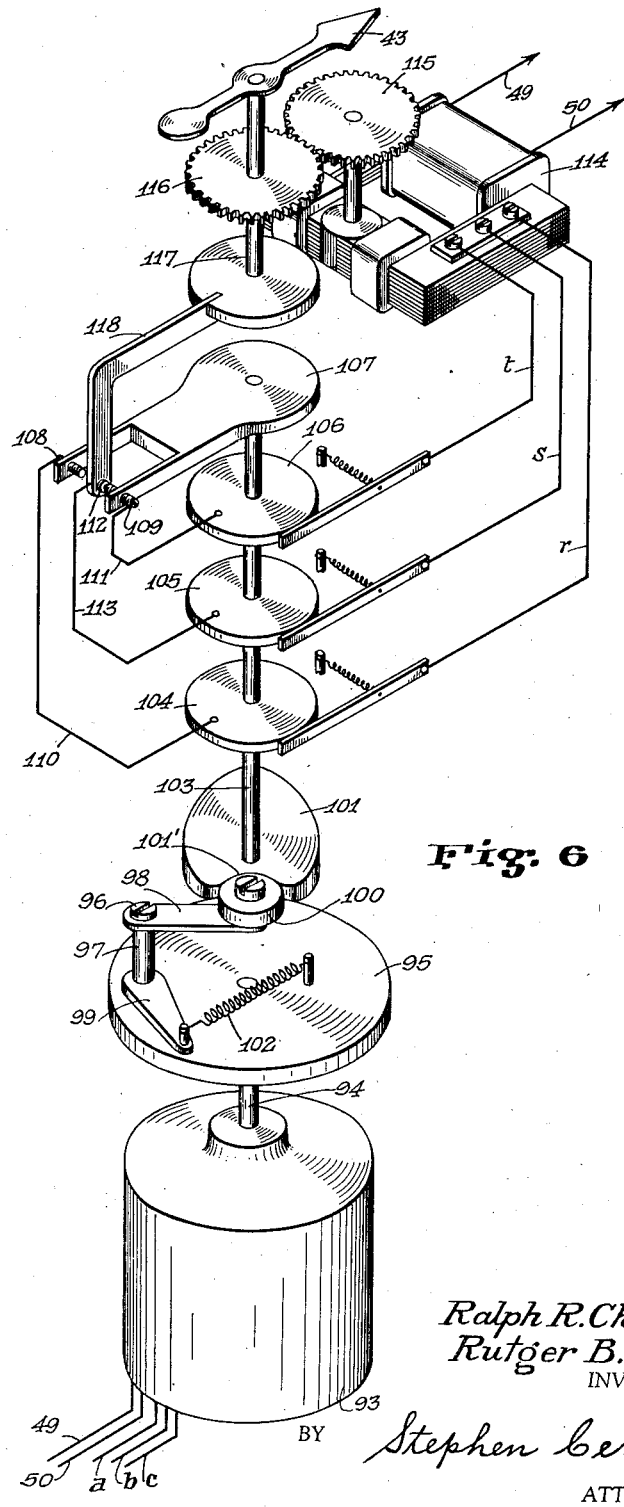

In lieu of the mechanism above described for damping the movements of vane 20, 21, suitable means associated with pointer 43 of the receiving instrument 44 may be provided for obtaining substantially the same results. One embodiment of the novel means which may be thus employed is illustrated in Fig. 6 in combination with the self-synchronous motor 93 which forms a part of instrument 44 and is connected to transmitting motor 48 by leads $a$, $b$ and $c$ and to a source of electric energy by leads 49 and 50. Armature shaft 94 of motor 93 has a crank rigidly secured thereto, said crank as shown being constituted by a disc 95 and a post 96 of which only the upper enlarged end can be seen in the drawings. A sleeve 97 is loosely mounted on said post and has a pair of radially extending arms 98 and 99 rigidly secured to the upper and lower ends thereof, respectively. Rotatably mounted on the outer end of arm 98 is a roller 100 which is yieldingly held in engagement with the periphery of a heart-shaped cam 101 by a spring 102 interposed between arm 99 and disc 95.

Cam 101 is secured to the lower end of a rotatable shaft 103 which is mounted concentrically with armature shaft 94, and is so shaped that roller 100 seeks the lowest point thereof i. e. the point which is the shortest radial distance from the center of shaft 103, said point being in a groove 101'. Thus, whenever roller 100 is revolved through the rotation of shaft 94 thereby causing the same to leave, or tend to leave, groove 101', the pressure applied by spring 102 is effective to cause the cam and shaft 103 to rotate and assume a position such that roller 100 rests in said groove.

Under normal conditions cam 101 will rotate in synchronism with shaft 94, roller 100 remaining at all times in groove 101'. In order to prevent the transmission of any quick, jerky or oscillatory movements to cam 101, novel means are provided for controlling the movement thereof in response to movements of roller 100. Said means in the form shown comprise three collector rings 104, 105 and 106 and a contact supporting member 107, all of which are rigidly secured to shaft 103 for rotation therewith. Said collector rings are made of electric current conducting materials and are electrically insulated in any suitable manner from shaft 103. Member 107 is preferably made of a suitable insulating material and has a radially extending bifurcated portion on which a pair of contacts 108 and 109 are adjustably mounted, said contacts being electrically connected by means of leads 110 and 111 to collector rings 104 and 106 respectively. Interposed between contacts 108 and 109 and adapted to engage either of the latter is a third contact 112 mounted in a manner to be more fully described hereafter which is electrically connected by lead 113 to collector ring 105. Collector rings 104, 105 and 106 are constantly connected to the shading coil windings of a small reversible induction motor 114 by means of suitable brushes and leads $r$, $s$ and $t$, respectively.

The armature shaft of motor 114 is drivably connected through a suitable gear train comprising gears 115 and 116 to a pointer shaft 117 which is also mounted concentrically with shaft 94 and carries the wind direction indicating pointer 43 which is adapted to move over the dial of instrument 44 (Fig. 2). An arm 118 on which contact 112 is mounted is rigidly secured to shaft 117 for rotation therewith and extends radially therefrom.

In the operation of a wind direction indicating system involving the novel damping means last described, the armature of motor 93 repeats the movements of the armature of motor 48, the latter armature being movable in response to and in synchronism with vane 20, 21 in the manner above set out. The rotation of shaft 94 is transmitted by means of cranks 95, 96 and 98, 99 and through roller 100 to heart-shaped cam 101. Under normal conditions when roller 100 is revolved slowly cam 101 will rotate in either direction in synchronism therewith, but when the movements of said roller are quick and jerky, such as may be caused by gusts of wind acting on vane 20, 21, the same will first ride up onto a higher part of the cam surface and the cam itself will follow the movement of the latter, under the control of the electrically controlled damping means associated therewith.

Movement of cam 101 by roller 100, say for example in a counterclockwise direction, causes contact 108 to move into engagement with contact 112 thereby closing a circuit through the shading coil windings of motor 114, said circuit comprising lead 110, collector ring 104, leads r and s, collector ring 105 and lead 113. The armature of motor 114 is thus caused to rotate in a clockwise direction and thereby actuate pointer 43 through the medium of gears 115 and 116 in a counterclockwise direction. Arm 118 which is attached to the same shaft as the pointer is also moved in a counterclockwise direction until contact 112 is moved out of engagement with contact 108, the latter occurring when pointer 43 has reached a position corresponding to the position of cam 101 which comes to rest with roller 100 in groove 101'. Upon movement of the cam in a clockwise direction, contacts 109 and 112 engage, thereby energizing motor 114 for operation in a counterclockwise direction for moving pointer 43 clockwise.

It will thus be seen that when the movements of roller 100 are such as to cause the same to move out of groove 101' there will be a definite time interval between the movements of the roller, which correspond to the movements of vane 20, 21, and the corresponding movements of pointer 43, and that this time interval may be varied by varying the reduction ratio of the gear train between the armature of motor 114 and pointer shaft 117. For example, if said ratio, which is shown as being 1 to 1, is doubled, the armature will have to make two revolutions instead of one to move pointer 43 a given distance, thereby doubling the time required for such movement, motor 114 being operable at a substantially constant speed. In the event vane 20, 21 and hence shaft 94 are caused to move suddenly in response to a gust of wind and then back to a position representative of the true direction of the wind, pointer 43 will not respond to this sudden movement unless the time interval of the gust is greater than that provided for in the transmission of motion from roller 100 to pointer 43 in the manner above described. Ordinarily, the direction indicating vane returns to its proper position after a gust before the pointer is permitted to respond. Likewise when vane 20, 21 oscillates at a comparatively high frequency, pointer 43 will assume an average position between the limits of the oscillations and accordingly give a steady indication of the resultant direction of the wind currents acting on the vane.

The above method which employs torque amplification, and the apparatus for carrying out said method may, if desired, be employed in connection with vane 20, 21, instead of pointer 43. If it is desired to place the unit at the sending station and within housing 10, this may be accomplished by merely providing gear teeth on disc 95 so that the same may be driven by vane 20, 21 through gear 45 instead of by motor 93. In order to transmit the motion of shaft 117 to remote indicators, said shaft may be connected to the armature of motor 48.

There is thus provided novel apparatus for determining and transmitting the force and direction of wind currents which is more compact and employs less parts than apparatus heretofore used in the determination and transmission of similar wind characteristics. Additionally, the unit provided is so constructed that the anemometer and direction indicating vane are subjected to currents in substantially the same location at substantially the same instant of time and the parts thereof are so arranged that one does not interfere with the wind currents acting upon the other, as is often the case when a plurality of separate units are employed. Novel means are also provided for damping the movements of a wind direction indicating vane or pointer and for making ready adjustments in a wind direction transmitting system.

Although only one embodiment of the invention has been illustrated and described, it is to be expressly understood that the same is not limited thereto but that various changes may be made, particularly in the design and arrangement of parts illustrated, without departing from the spirit and scope of the invention, as will now be apparent to those skilled in the art. For example, cups 33 may be mounted on spindle 23 and vane 20 on spindle 36, if desired, and a bridled anemometer may be employed in lieu of the rotating type illustrated and described, in which event distributing unit 77 may be dispensed with. For a definition of the limits of the invention, reference will be had primarily to the appended claims.

What is claimed is:

1. In an indicating apparatus for indicating a variable quantity, the combination of a controlling member and a controlled member, a transmitter controlled by said controlling member, a receiver cooperating with said transmitter, and means for connecting said receiver to said controlled member, said means including a pair of relatively rotatable shafts, a lost motion connection for connecting one end of one of said pair of shafts to said receiver, a plurality of electrical contact members positioned on said one shaft, means including a pair of spaced contacts connected to the other end of said one shaft, each of said pair of contacts connected to one of said plurality of electrical contacts, said controlled member connected to one end of the other of said pair of shafts, a contact member positioned on the other end of said other shaft and adapted to contact one or the other of said pair of spaced contacts, said contact member being electrically connected with another of said plurality of contact members, a reversible electric motor drivably connected to said other shaft for controlling said controlled member, shading coils associated with said motor for controlling the direction of rotation thereof, and means for connecting said plurality of contact members to said coils whereby the direction of rotation of said motor is controlled by the direction of rotation of said one shaft.

2. In an indicating apparatus for indicating a variable quantity, the combination of a wind direction indicating vane, a controlled member and means for transmitting movement of said vane to said controlled member, said means including an electrical transmitting and receiving apparatus, said vane operatively connected to said transmitter, means for connecting said controlled member to said receiver, last named means including a a pair of relatively rotatable shafts, one end of one of said pair of shafts connected to said controlled member, a lost motion connection connecting one end of the other of said pair of shafts to said receiver, electrical switching means positioned between the other ends of said pair of shafts, electrical contact means positioned on said other shaft and electrically connected to said switching means, a reversible electric motor drivably connected to said controlled member, shading coils associated with said motor for controlling the direction of rotation thereof, and means for connecting said shading coils to said electrical contact means whereby the direction of current flowing through said shading coils will change when the direction of rotation of said other shaft changes.

RALPH R. CHAPPELL.
RUTGER B. COLT.